United States Patent
Chovel et al.

(10) Patent No.: US 11,281,705 B2
(45) Date of Patent: Mar. 22, 2022

(54) SUGGESTED OFFERINGS (71) Applicant: HEWLETT PACKARD ENTERPRISE DEVELOPMENT LP, Houston, TX (US)

(72) Inventors: Shlomi Chovel, Yehud (IL); Shiran Gabay, Yehud (IL); Yariv Snapir, Kibbutz Hulda (IL)

(73) Assignee: Micro Focus LLC, Santa Clara, CA (US)

( * ) Notice: Subject to any disclaimer, the term of this patent is extended or adjusted under 35 U.S.C. 154(b) by 789 days.

(21) Appl. No.: 15/372,114

(22) Filed: Dec. 7, 2016

(65) Prior Publication Data

US 2018/0157740 A1 Jun. 7, 2018

(51) Int. Cl.
*G06F 16/33* (2019.01)
*G06F 16/9535* (2019.01)

(52) U.S. Cl.
CPC ........ *G06F 16/334* (2019.01); *G06F 16/9535* (2019.01)

(58) Field of Classification Search
CPC .................................................. G06F 16/334
See application file for complete search history.

(56) References Cited

U.S. PATENT DOCUMENTS 8,762,326 B1 6/2014 Zhou et al.
9,881,226 B1* 1/2018 Rybakov ............ G06K 9/00201
2011/0307294 A1* 12/2011 Barkai ............... G06Q 30/0201
 705/7.29
2013/0110823 A1 5/2013 Su et al.
2013/0159298 A1* 6/2013 Mason ................ G06F 16/9535
 707/728
2013/0298084 A1* 11/2013 Spivack ................ H04L 65/403
 715/854
2014/0365327 A1* 12/2014 Crossan ................ G06Q 30/08
 705/26.4
2015/0067505 A1 3/2015 Metcalf et al.
2016/0041985 A1* 2/2016 Manterach ........ G06F 16/24578
 707/727
2016/0063597 A1 3/2016 Goulart
2016/0188704 A1* 6/2016 Dassa ................. G06F 16/9535
 707/750

(Continued)

OTHER PUBLICATIONS

Li, H. et al., "NetnewsBusty Hot Topic Detection BAsed on Bursty Features," (Research Paper), 2010 International Conference on E-Business and E-Government (ICEE), May 7-9, 2010, pp. 1437-1440, available at http://dl.acm.org/citation.cfm?id=1903409.

(Continued)

*Primary Examiner* — Dawaune A Conyers (57) ABSTRACT

Examples relate to determining suggested offerings for users. The examples disclosed herein identify, a recent entity accessed by a user. The recent entity is matched with a trending topic, where the trending topic is determined by analyzing recent entities accessed by a plurality of users. A number of suggested offerings from the trending topic is calculated based on an importance score of the matched trending topic. At least one suggested offering for the trending topic is determined, based on the number of suggested offerings, from the recent entities accessed by the plurality of users. The at least one suggested offering is suggested to the user.

20 Claims, 4 Drawing Sheets

(56) References Cited

U.S. PATENT DOCUMENTS

2016/0321261 A1* 11/2016 Spasojevic .......... G06F 16/9535
2018/0075128 A1* 3/2018 Srinivasan ......... G06Q 30/0201

OTHER PUBLICATIONS

Wang, X. et al., "A Method of Hot Topic Detection in Blogs Using N-gram Model," (Research Paper), Journal of Software, Jan. 2013, pp. 184-191, vol. 8, No. 1, available at http://www_jsoftware_us/vol8/jsw0801-24.pdf.

* cited by examiner

SUGGESTED OFFERINGS

BACKGROUND

Information technology (IT) can include an applications and systems for storing, retrieving, transmitting, and manipulating data. Information technology (IT) support agents (e.g., a user) can handle multiple IT requests at a given time. For example, an application system may allow a user to create, escalate, execute, and monitor service requests, as well as accessing other resources such as articles.

BRIEF DESCRIPTION OF THE DRAWINGS

The following detailed description references the drawings, wherein.

DETAILED DESCRIPTION

IT service management systems may provide an user interface for users to create, escalate, execute, and/or monitor services, requests, articles, and other entities of the system. For example, a self-service portal may provide a user with the ability to manage and access pertinent entities of an IT service management system. However, users may not always know how to find the knowledge or service catalog items that are most suitable for particular situations.

Proposed solutions may provide suggestions relevant to a user's actions. For example, when a user enters a search term, the user is suggested offerings that are related to the search term. When a user views a particular article or offerings page, the user may receive related suggestions based on the page the user is viewing. In other examples, a user may subscribe to services or categories of services to receive future suggestions related to the subscriptions. However, these solutions depend on some form of proactive input or action from the user.

Examples disclosed herein provide a tool that provides users with smart personal offering suggestions that are relevant to their actions and earlier system usage information. This may ease the use of an IT application for users, because users may be able to immediately access what they most likely may need or most likely to find interesting, straight from a main page. For example, a computing device disclosed herein may enable identifying a recent entity accessed by a user, and matching the recent entity with a trending topic where the trending topic is determined by analyzing recent entities accessed by a plurality of users. The example computing device enables calculating a number of suggested offerings from the trending topic based on an importance score of the matched trending topic. The example computing device enables determining, based on the number of suggested offerings, at least one suggested offering, from the recent entities accessed by the plurality of users, for the trending topic. The suggested offering may then be suggested to the user. In this manner, examples disclosed herein may predict what a user is interested in without any action on the user's part based on statistical factors such as the latest actions and usages of the user and other users of the system.

Figure 1:
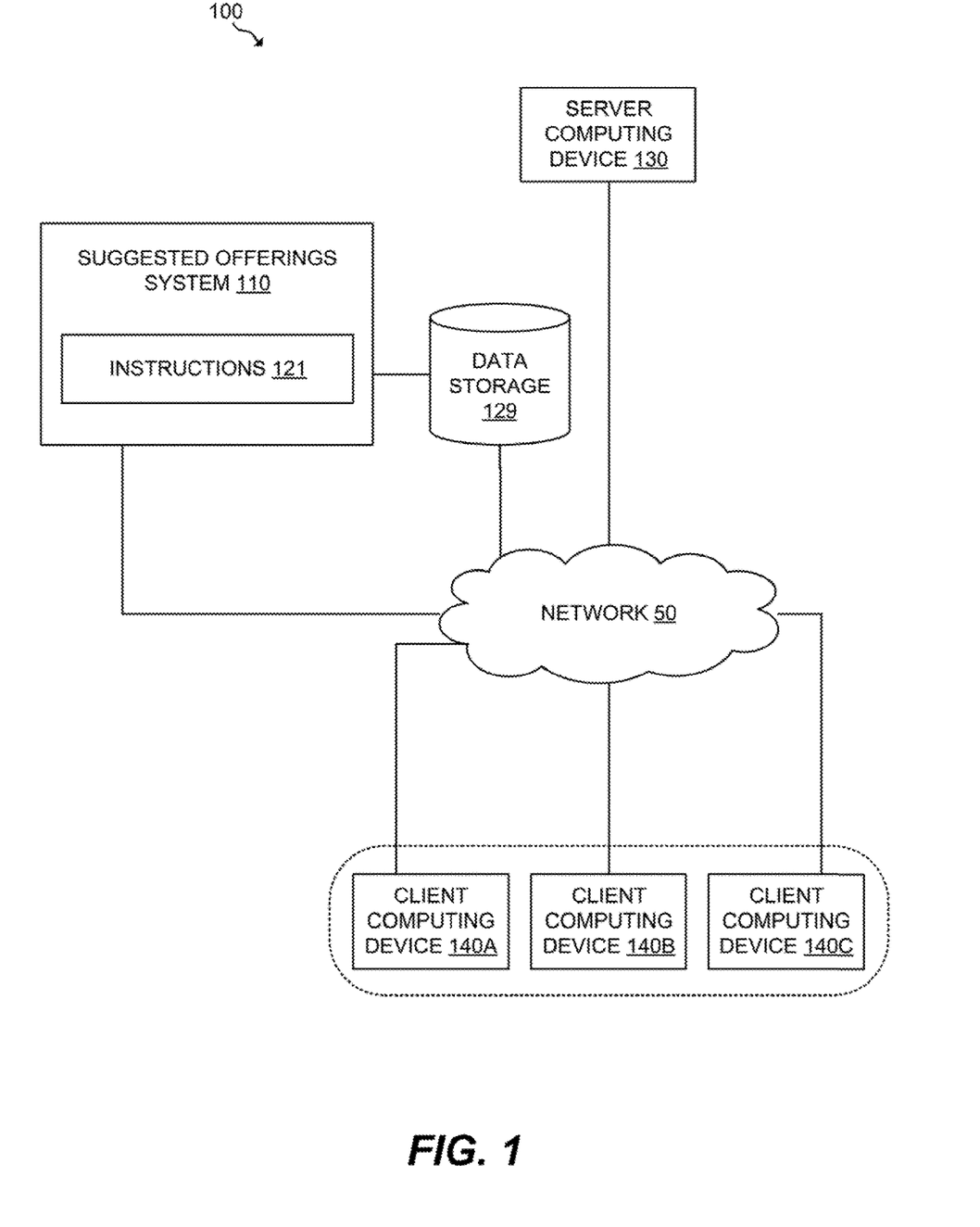
FIG. 1 is a flowchart of an example environment in which various examples may be implemented.

Referring now to the drawings, FIG. 1 is an example environment 100 in which various examples may be implemented as a suggested offerings system 110. As illustrated in the example of FIG. 1, environment 100 may include client (user) devices 140A, 140B, and 140C, and a server device 130. Each client device 140A-140C may be a computing device to communicate requests to and receive responses from server 130. Server device 130 represents a computing device capable of receiving and responding to requests from client devices 140A-140C. Client devices 140A-140C may be any type of computing device providing a user interface through which a user can interact with a software application. For example, client computing devices 140A-140C may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client devices 140A-140C. In some examples, the software application served by server device 130 may be a web application, which may be delivered to a user via a web client, such as a web browser via a network such as the internet.

The various components (e.g., components 110, 130, 140A-140C, etc.) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, suggested offerings system 120 and the various components described herein may be implemented in hardware and/or a combination of hardware and programming that configures hardware. Furthermore, in FIG. 1 and other Figures described herein, different numbers of components or entities than depicted may be used.

Server computing device 130 may serve an application for consumption by client devices 140A-140C. Users may interact with the application via user interfaces of client devices 140A-140C. Through the user interfaces, those users can take a number of actions including starting or opening a user session and interacting with user interface controls. As described in further detail herein, application events may occur as a result of those user actions. Events can include application launch, responses or results of such actions such user interface updates or changes in response to a selection of a control. Events can also include application faults such as errors and crashes.

Suggested offerings system 110 may represent a combination of hardware and programming to determine suggested offerings for a user based on application events occurring during user sessions with respect to client devices 140A-140C. In doing so, system 110 collects user event data items from client devices 140A-140C, including recent entities accessed by a user. Each of the recent entities accessed by a user may be matched with at least one of a trending topic, where each trending topic is determined by analyzing recent topics accessed by a plurality of users on client devices 140A-140C. Each entity accessed by the user or the plurality of users may be delivered to users on client devices 140A-140C through an application, such as an IT service management system, served by server device 130. In some examples, each entity accessed by a user may be associated with application environment characteristics such as a particular user, a particular client device, a client device location, an operating system, and an application version. Entities accessed by the users may, in some examples, include requests for services and support. Additionally or in other examples, entities accessed by the users may include articles opened by a user in a client device or programs or features used by a user.

System 110 may calculate, based on an importance score of each of the matched trending topics, numbers of suggested offerings from the matched trending topics. As described in detail herein, importance scores of trending topics may be calculated based on a number of recent entities matched with particular trending topics among a predetermined number of latest entities accessed by the user. Based on the numbers of suggested offerings, at least one offering may be determined for each matched trending topic, from the recent entities accessed by the plurality of users. In some examples, system 140 may suggest the suggested offerings to a user. For example, suggesting may include communicating suggested offerings as electronic messages. In some examples, system 110 may generate a visual representation of the suggested offerings via a client device 140A-140C.

Furthermore, the data (e.g., entities, trending topics, importance scores, suggested offerings, etc.) used in the functionality described in relation to system 140 may be stored in a data storage 129. A data storage 129 may include any recording media used to retain digital data, including semiconductor-based memory, magnetic storage, optical storage, etc. Data storage 129 may utilize both memory and storage, and may store data across a network of storage devices. Storage devices may be located on a computing device or distributed across multiple physical locations. In such instances, storage devices used by data storage 129 may be physically connected or linked together by a network such as network 50.

Suggested offerings system 110 may be integrated entirely in server computing device 130 or distributed across multiple server devices not shown. In other examples or in addition, system 110 may also be distributed across server device 130 and client devices 140A-140C. For example, system 110 may include agent components operating on client devices 140A-140C and calculation components operating on server computing device 130. In this example distributed model, the agent components may be responsible for reporting user activities to the calculation components which in turn may be responsible for processing that activities data into suggested offerings.

The term "component", as used with reference to system 110, may refer to a combination of hardware and programming that performs a designated function. For example, the hardware of each component, for example, may include one or both of a processor and a machine-readable storage medium, while the programming is instructions (i.e., instructions 121)) or code stored on the machine-readable storage medium and executable by the processor to perform the designated function. In addition or in other examples, each component may include at least one hardware devices including electronic circuitry for implementing the functionality described below.

Figure 2:
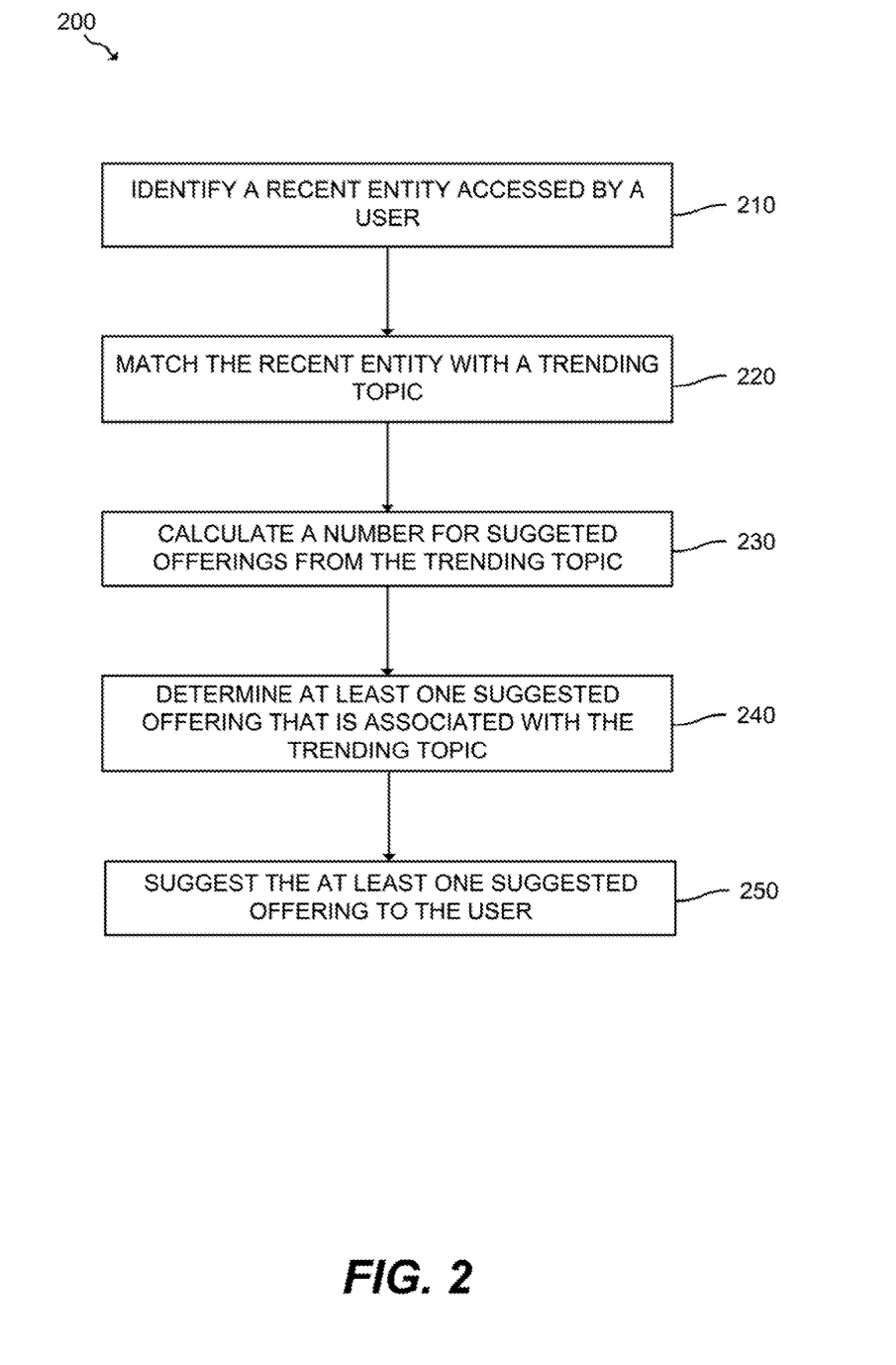
FIG. 2 is a flowchart of an example method for determining suggested offerings.

FIG. 2 is a flowchart of an example method 200 for determining suggested offerings. The various processing blocks and/or data flows depicted in FIG. 2 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 200 as illustrated (and described in greater detail below) is meant be an example and, as such, should not be viewed as limiting. Method 200 may be implemented in the form of executable instructions stored on a machine-readable storage medium, such as storage medium 320 described below with relation to computing device 300 of FIG. 3, and/or in the form of electronic circuitry.

In an operation 210, a recent entity accessed by the user may be identified. For example, a server device 130 of system 110 may identify a recent entity accessed by a user from client device 140A, 140B, or 140C. Entities may be actions or objects taken or accessed by a user via a client device. For example, entities may include requests made by the user, such as a service or support requests, and/or articles and pages accessed by the user. A recent entity may be an entity that the user had recently accessed. For example, a recent entity may be the immediately previous entity that the user accessed. In some examples, a recent entity may be one of a plurality of recent entities accessed by the user, which may generally include the user's recent past activity. As understood herein, recent entities are those accessed within a predetermined threshold period of time before the current time, or those accessed within a predetermined last finite number of entities (e.g., within the last 10 entities accessed by the user).

In an operation 220, the recent entity identified in operation 210 may be matched with a trending topic. For example, server device 130 may match the recent entity accessed by a user from client device 140A, 140B, or 140C to a trending topic, which may be stored in data storage 129. Textual data of the recent entity accessed by the user may be extracted to identify relevant words from the entity, which may be used to match with textual data of trending topics. In some examples, the trending topic may be determined by analyzing recent entities accessed by a plurality of users. Recent entities may be entities that multiple users had recently accessed. The plurality of users may be all of the users of the system, such as system 110, or a subset of users of the system. The trending topics may be determined by analyzing a predetermined number of recent entities accessed by the plurality of users.

In some examples, the recent entities accessed by the plurality of users may include multiple types of entities comprising textual data. For example, entities may include requests with textual descriptions and/or articles including textual content. The trending topics may be determined by analyzing textual data records of the recent entities accessed by the plurality of users to identify statistically common words of the trending topic. For example, a statistically common word, phrase, or group of words that appear for a particular minimum number of occurrences among the recent entities accessed by the plurality of users may be determined to be a trending topic. In other examples or in addition, words that appear in a certain number of recent entities or more may be determined to be a trending topic. In some examples, it may be determined that the recent entities accessed by the plurality of users may have one trending topic. In other examples, there may be no trending topics or multiple trending topics.

In an operation 230, a number of suggested offerings from the trending topic matched in operation 220 may be calculated based on an importance score of the matched trending topic. The number of suggested offerings indicate how many suggested offerings are to be suggested to the user. For example, server device 130 may calculate a number of suggested offerings from the trending topic matched in operation 220 based on an importance score of the matched trending topic, which may be stored in data storage 129. The importance score of the matched trending topic may indicate a popularity and/or frequency of the trending topic among a predetermined number of latest entities accessed by the user. The importance score may, for example, be calculated based on a number of recent entities matched with the particular trending topic from among the predetermined number of latest entities accessed by the user.

Additionally, the number of suggested offerings may also be influenced by a number of offerings with which a user is to be suggested. For example, a user interface of client device 140A, 140B, and 140C may limit the number of suggested offerings that are to be suggested to the user. Such a limitation could be the result of physical design constraints or settings determined by an administrator.

Furthermore, in some examples, the number may also be influenced by a frequency score of the particular entity accessed by the user. For example, in instances where more than one recent entity was identified in operation 210, proportion of a particular recent entity accessed by the user relative to all of the recent entities accessed by the user may determine what number of suggested offerings are suggested for a particular matched trending topic. This is further illustrated herein with relation to FIG. 4.

In an operation 240, at least one suggested offering may be determined from the recent entities accessed by the plurality of users for a matched trending topic, based on a calculated number of suggested offerings. For example, server device 130 may determine the suggested offering(s) from the recent entities accessed by the plurality of users stored in data storage 129 for a trending topic matched in operation 220 based on the number of suggested offerings calculated in operation 230. A suggested offering may be a presentation of a suggested entity for a user to access. For example, a suggested offering may include a recommended support and/or service offering of the trending topic and/or a related article of the trending topic. In some examples, the at least one suggested offering may include at least one entity associated with the matched trending topic that has not been previously accessed by the user. For instance, a user may have accessed certain entities pertaining to a particular topic. Service device 130 may determine, for that user, a suggested offering that is another particular entity pertaining to the particular topic that the user has not previously accessed.

Furthermore, in some examples, the at least one suggested offering may be determined by analyzing a relevance score for each of the recent entities accessed by the plurality of users that is associated with the trending topic. A relevance score for a recent entity accessed by a plurality of users may indicate how related the particular recent entity is to a particular trending topic. As described previously herein, trending topics may be determined by identifying statistically common words of the plurality of recent entities accessed by the plurality of users. However, some entities may include more occurrences of particular phrases of a topic, and those entities may have higher relevance scores than other entities which, for example, might contain less frequent occurrences of particular phrases of the topic. In this manner, the most relevant entities may be included in suggested offerings for a user.

In an operation 250, the suggested offering may be suggested to the user. For example, a visual representation of the suggested offering determined in operation 240 above may be displayed via a user interface on a client computing device (e.g., 140A-140C). Communicating the suggested offering to a user may suggest, to the user, entities related to the user's previous recent activity, which may allow the user to easily access potentially pertinent content.

Figure 3:
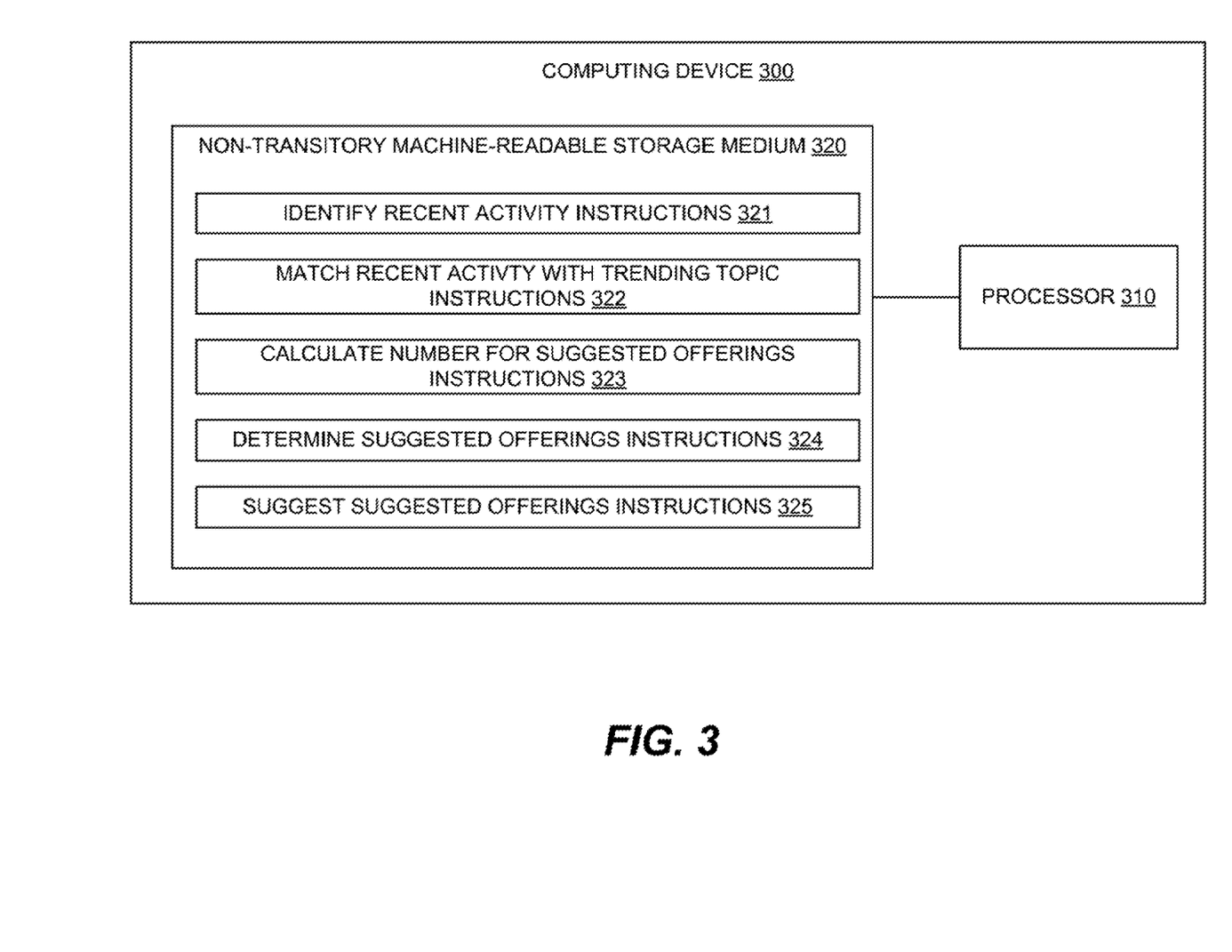
FIG. 3 is a block diagram of an example computing device for determining suggested offerings.

FIG. 3 shows a block diagram depicting an example computing device 300 for determining suggested offerings. Computing device 300 may include a server, cloud-based server, laptop computing device, a desktop computing device, an all-in-one computing device, a tablet computing device, a mobile phone, an electronic book reader, a network-enabled appliance such as a "Smart" television, and/or other electronic device suitable for the functions described herein. Computing device 300 may, for example, be analogous to server computing device 130 of FIG. 1.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321, 322, 323, 324, 325, and/or other instructions. In other examples or in addition to retrieving and executing instructions, processor 310 may include at least one electronic circuit comprising a number of electronic components for performing the functionality of at least one of instructions 321, 322, 323, 324, 325, and/or other instructions.

Machine-readable storage medium 320 may be any electronic, magnetic, optical, or other physical storage device that contains or stores executable instructions. In some implementations, machine-readable storage medium 320 may be a non-transitory storage medium, where the term "non-transitory" does not encompass transitory propagating signals. Machine-readable storage medium 320 may be implemented in a single device or distributed across devices. Likewise, processor 310 may represent any number of processors capable of executing instructions stored by machine-readable storage medium 320. Processor 310 may be integrated in a single device or distributed across devices. Further, machine-readable storage medium 320 may be fully or partially integrated in the same device as processor 310, or it may be separate but accessible to that device and processor 310.

In one example, the program instructions may be part of an installation package. In this case, machine-readable storage medium 320 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 may include a hard disk, optical disk, tapes, solid state drives, RAM, ROM, EEPROM, or the like. The executable program instructions in machine-readable storage medium 320 are depicted as identify recent activity instructions 321, match recent activity with trending topic instructions 322, calculate number of suggested offerings instructions 323, determine suggested offerings instructions 324, and suggest suggested offerings instructions 325.

When executed by processor 310, instructions 321, 322, 323, 324, 325 may respectively cause computing device 300 to implement blocks 210, 220, 230, 240, and 250 of method 200, or analogues thereof. Accordingly, computing device 300 may identify recent entities accessed by a user, match each of the recent entities with at least one of a plurality of trending topics, calculate numbers of suggested offerings from the trending topics based on an importance score of each of the matched trending topics, determine at least one suggested offering for each matched trending topic from the recent entities accessed by a plurality of users based on the numbers of suggested offerings, and suggest the suggested offerings to the user.

Figure 4:
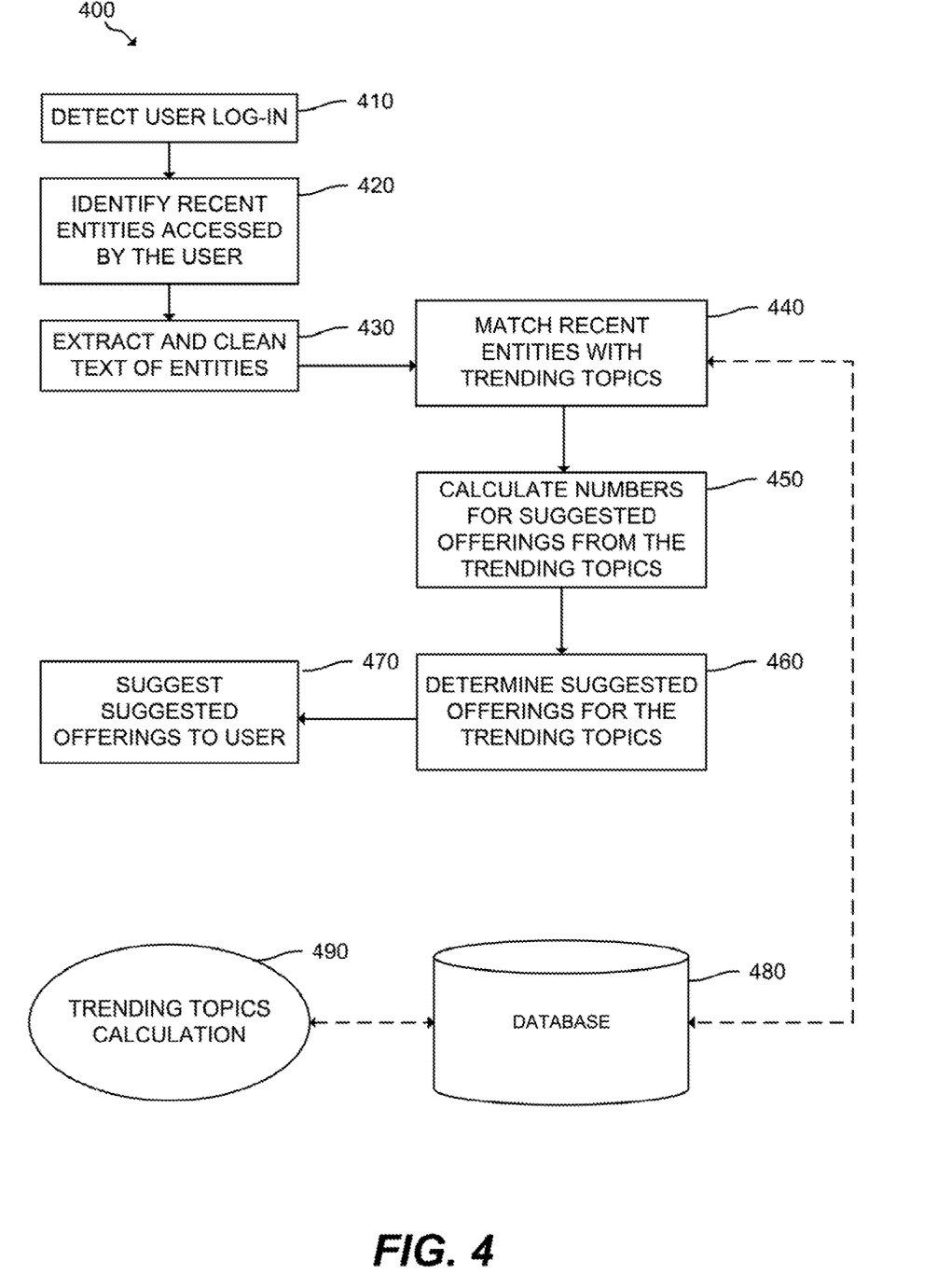
FIG. 4 is a flowchart of a second example method for determining suggested offerings.

FIG. 4 is a flowchart of a second example method 400 for determining suggested offerings. As with method 200 of FIG. 2, the described processing blocks may be accomplished using some or all of the system components described in detail in FIG. 1 and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 400 as illustrated is meant be an example and, as such, should not be viewed as limiting. Method 400 may be implemented in the form of executable instructions stored on a machine-readable storage medium, such as storage medium 320 of computing device 300 of FIG. 3, and/or in the form of electronic circuitry.

In an operation 410, a user log-in may be detected. For example, a client device (i.e., client device 140A) may detect when a user accesses a user interface of an IT system. The user log-in may be associated a particular user account, which may include various data on the user. For example, a particular user account may be associated with a user history, which includes the user's past activity and system entities accessed by the user.

In an operation 420, a plurality of recent entities accessed by the particular user may be identified. For example, after detecting the user log-in and accessing that particular user's profile, a recent group of requests and articles accessed by the user may be identified. The plurality of recent entities may be stored as metadata in a database, such as database 480 for example.

In an operation 430, text of the recent entities accessed by the particular user, as identified in operation 420, may be extracted and cleaned. In some examples, the recent entities may contain textual data records, such as textual description of requests and textual content of articles. This textual data may be extracted and cleaned so that the data may be effectively used to match with trending topics, as described herein. For example, text of a recent entity may be scanned for particular words, symbols, or characters to be removed from further analysis. As a specific example, common words such as "and" or "the" may be cleaned out of textual data.

In an operation 440, each of the extracted and cleaned plurality of recent entities may be matched with at least one of a plurality of trending topics. For example, the extracted and cleaned textual data of each recent entity accessed by the user may be examined to identify relevant words from each entity, which may be used to match with textual data of trending topics. The plurality of trending topics may be determined by analyzing a predetermined number of recent entities accessed by a plurality of users, such as all or a subset of users of a system. For example, in trending topics calculations 490, the trending topics may be determined by analyzing textual data records of the recent entities accessed by the plurality of users to identify statistically common words of the trending topic. For example, a statistically common word, phrase, or group of words that appear for a particular minimum number of occurrences among the recent entities accessed by the plurality of users may be determined to be a trending topic. In other examples or in addition, words that appear in a certain number of recent entities or more may be determined to be a trending topic. Trending topics may be determined, stored, and updated in database 480. Database 480 may be any device, system, or network that can store computer data. Database 480 may be analogous to data storage 129.

In an operation 450, numbers of suggested offerings from matched trending topics may be calculated based on an importance score of each of the matched trending topics. The importance score of each matched trending topic may indicate a popularity and/or frequency of a corresponding trending topic among a predetermined number of latest entities accessed by the user. The importance score for a particular trending topic may, for example, be calculated based on a number of recent entities matched with the particular trending topic from among the predetermined number of latest entities accessed by the user. Additionally, the numbers of suggested offerings may also be influenced by a number of offerings with which a user is to be suggested. For example, a user interface design may limit the number of suggested offerings that are to be suggested to the user.

Furthermore, in some examples, each number of suggested offerings may also be influenced by a frequency score of a particular entity accessed by the user. For example, the proportion of a particular recent entity accessed by the user relative to all of the recent entities accessed by the user may determine what number of suggested offerings are suggested for a particular matched trending topic. As a specific illustrated example, of ten recent entities accessed by a user, two may be matched with trending topic X, five may be matched with trending topic Y, and three may be matched with trending topic Z. If six total suggested offerings are to be suggested to the user, the number of suggested offerings from trending topic X may be one, the number of suggested offerings from trending topic Y may be three, and number of suggested offerings from trending topic Z may be two. In, this manner, trending topics that more frequently match with the user's recently accessed entities get more suggested offerings, and vice versa.

In an operation 460, at least one suggested offering for each matched trending topic is determined from the recent entities accessed by the plurality of users based on the numbers of suggested offerings by analyzing a relevance score for each of the recent entities accessed by the plurality of user that is associated with at least one of the matched trending topics. As described previously, a suggested offering may be a presentation of a suggested entity for a user to access, and may include, for example, a recommended request of the trending topic and/or a related article of the trending topic. In some examples, the at least one suggested offering may include at least one entity associated with the matched trending topic that has not been previously accessed by the user.

A relevance score for a recent entity accessed by a plurality of users may indicate how related the particular recent entity is to a particular trending topic. For example, some entities may include more occurrences of particular phrases of a topic, and those entities may have higher relevance scores than other entities which, for example, might contain less frequent occurrences of particular phrases of the topic. In this manner, the most relevant entities may be included in suggested offerings for a user.

In an operation 470, the suggested offerings determined in operation 460 may be suggested to the user. Communicating the suggested offering to a user may recommend, to the user, entities related to the user's previous recent activity, which may allow the user to easily access potentially pertinent content. In this manner, examples disclosed herein may predict what a user is interested in without any action on the user's part based on statistical factors such as the latest actions and usages of the user and other users of the system.

The foregoing disclosure describes a number of examples for determining suggested offerings to suggest to a user. The disclosed examples may include systems, devices, computer-readable storage media, and methods for generating recommended inputs. For purposes of explanation, certain examples are described with reference to the components illustrated in FIGS. 1-4. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The terminology used herein is for the purpose of describing particular examples and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of at least one of the associated listed items. It will also be understood that, although the terms first, second, third, etc. may be used herein to describe various elements, these elements should not be limited by these terms, as these terms are used to distinguish one element from another unless stated otherwise or the context indicates otherwise. As used herein, the term "includes" means includes but not limited to, the term "including" means including but not limited to. The term "based on" means based at least in part on.

What is claimed is:

1. A method for execution by a computing device for providing suggestions to a user without any action on the user's part based on previous actions and usages of the user and other users, the method comprising:
   electronically identifying, by a server, a first recent entity accessed by a given user of a plurality of users over a computer network;
   electronically matching, by the server, the first recent entity with a trending topic, trending over the computer network, wherein the trending topic is determined by electronically analyzing a plurality of recent entities accessed by the plurality of users over the computer network;
   calculating, by the server, a number based on an importance score of the trending topic, wherein the number represents how many suggested offerings for the trending topic are to be presented to the given user,
   wherein the importance score is based on a frequency and popularity of recent entities electronically matched with the trending topic from among a predetermined number of latest entities accessed by the given user;
   determining the suggested offerings for the trending topic according to the number from the plurality of recent entities; and
   electronically providing data to present the suggested offerings for the trending topic to the given user.

2. The method of claim 1, further comprising electronically analyzing textual data records of the plurality of recent entities to identify statistically common words of the trending topic, and determining the trending topic based on the statistically common words.

3. The method of claim 1, wherein:
   the electronically identifying comprises electronically identifying a subset of the plurality of recent entities accessed by the given user; and
   the electronically matching comprises electronically matching each entity of the subset with at least one topic of a plurality of trending topics trending over the computer network determined by electronically analyzing the plurality of recent entities accessed by the plurality of users.

4. The method of claim 1, wherein the suggested offerings for the trending topic comprise at least one entity associated with the trending topic trending over the computer network which has not been accessed by the given user.

5. The method of claim 1, wherein the first recent entity comprises a service request.

6. The method of claim 1, wherein the first recent entity comprises an article.

7. The method of claim 1, wherein the determining comprises electronically analyzing a relevance score for each recent entity of the plurality of recent entities.

8. The method of claim 1, wherein the plurality of recent entities comprises multiple types of entities comprising textual data.

9. The method of claim 1, wherein the number of how many suggested offerings for the trending topic are to be presented to the given user is based on a proportion of a total number of recent entities accessed by the user.

10. A non-transitory machine-readable storage medium storing instructions for providing suggestions to a user without any action on the user's part based on previous actions and usages of the user and other users that, when executed by a processor of a computing device, cause the processor to:

electronically identify a first plurality of recent entities accessed by a given user of a plurality of users over a computer network;

electronically match each recent entity of the first plurality of recent entities with at least one trending topic of a plurality of trending topics, trending over the computer network, wherein the plurality of trending topics is determined by electronically analyzing a second plurality of recent entities accessed by the plurality of users over the computer network;

calculate a number based on an importance score of each trending topic of the plurality of trending topics, trending over the computer network, wherein the number represents how many suggested offerings for each trending topic are to be presented to the given user, wherein the importance score of a particular trending topic of the plurality of trending topics is based on a frequency and popularity of recent entities electronically matched with the particular trending topic from among a predetermined number of latest entities accessed by the given user;

determine the suggested offerings for the trending topic according to the number from the second plurality of recent entities; and electronically provide data to present the suggested offerings for the trending topic to the given user.

11. The non-transitory machine-readable storage medium of claim 10, wherein the instructions, when executed by the processor, further cause the processor to electronically analyze textual data records of the second plurality of recent entities to identify statistically common words of the plurality of trending topics, and determine the plurality of trending topics based on the statistically common words.

12. The non-transitory machine-readable storage medium of claim 10, wherein the suggested offerings for the trending topic comprise at least one entity associated with at least one trending topic of the plurality of trending topics trending over the computer network.

13. The non-transitory machine-readable storage medium of claim 10, wherein the second plurality of recent entities comprises multiple types of entities comprising textual data.

14. The non-transitory machine-readable storage medium of claim 10, wherein the instructions, when executed by the processor, further cause the processor to electronically analyze a relevance score for each recent entity of the second plurality of recent entities, and determine the suggested offerings for the trending topic based on the relevance scores.

15. The non-transitory machine-readable storage medium of claim 10, wherein a number of how many suggested offerings for the trending topic are to be presented to the given user is based on a proportion of a total number of recent entities accessed by the user.

16. A computing device for providing suggestions to a user without any action on the user's part based on previous actions and usages of the user and other users comprising:

a processor, wherein the processor is configured to:

electronically identify a first plurality of recent entities accessed by a given user of a plurality of users;

electronically match each recent entity of the first plurality of recent entities with at least one trending topic of a plurality of trending topics, trending over a computer network, wherein the plurality of trending topics is determined by electronically analyzing a second plurality of recent entities accessed by the plurality of users over a computer network;

calculate a number based on an importance score of each trending topic of the plurality of trending topics trending over the computer network, wherein the number represents how many suggested offerings for tho each trending topic are to be presented to the given user, wherein the importance score of a particular trending topic of the plurality of trending topics trending over the computer network is based on a frequency and popularity of recent entities electronically matched with the particular trending topic from among a predetermined number of latest entities accessed by the given user;

determine the suggested offerings for the trending topic according to the number from the second plurality of recent entities; and electronically provide data to present the suggested offerings for the trending topic to the given user.

17. The computing device of claim 16, wherein the processor electronically analyzes textual data records of the second plurality of recent entities to identify statistically common words of the trending topics, and determine the plurality of trending topics based on the statistically common words.

18. The computing device of claim 16, wherein the second plurality of recent entities comprises multiple types of entities comprising textual data.

19. The computing device of claim 16, wherein the suggested offerings for the trending topic comprise at least one entity associated with at least one trending topic of the plurality of trending topics.

20. The computing device of claim 16, wherein a number of how many suggested offerings for the trending topic are to be presented to the given user is based on a proportion of a total number of recent entities accessed by the user.

* * * * *